US010760467B2

(12) United States Patent
Klietz et al.

(10) Patent No.: US 10,760,467 B2
(45) Date of Patent: Sep. 1, 2020

(54) VEHICLE COMPRISING A DUAL-BRANCH EXHAUST SYSTEM

(71) Applicant: Bayerische Motoren Werke Aktiengesellschaft, Munich (DE)

(72) Inventors: Matthias Klietz, Dachau (DE); Mustafa Idikurt, Munich (DE); Gerd Schuster, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 51 days.

(21) Appl. No.: 15/981,231

(22) Filed: May 16, 2018

(65) Prior Publication Data
US 2018/0258824 A1 Sep. 13, 2018

Related U.S. Application Data

(63) Continuation of application No. PCT/EP2016/079848, filed on Dec. 6, 2016.

(30) Foreign Application Priority Data

Dec. 16, 2015 (DE) .................. 10 2015 225 367
Jan. 18, 2016 (DE) .................. 10 2016 200 536

(51) Int. Cl.
*F01N 13/04* (2010.01)
*B60K 13/04* (2006.01)
(Continued)

(52) U.S. Cl.
CPC ............. *F01N 13/04* (2013.01); *B60K 1/04* (2013.01); *B60K 13/04* (2013.01); *F01N 13/08* (2013.01);
(Continued)

(58) Field of Classification Search
CPC combination set(s) only.
See application file for complete search history.

(56) References Cited

U.S. PATENT DOCUMENTS 3,472,548 A * 10/1969 Comisac .................. B60P 1/28
296/183.2
3,763,950 A 10/1973 Rockwell
(Continued)

FOREIGN PATENT DOCUMENTS

CN 203856608 U 10/2014
DE 92 17 505 U1 5/1993
(Continued)

OTHER PUBLICATIONS

International Search Report (PCT/ISA/210) issued in PCT Application No. PCT/EP2016/079848 dated Mar. 8, 2017 with English translation (eight pages).
(Continued)

Primary Examiner — Binh Q Tran
(74) Attorney, Agent, or Firm — Crowell & Moring LLP

(57) ABSTRACT

A vehicle has an internal combustion engine and an exhaust system. The exhaust system has a first exhaust tract with a first exhaust outlet extending into the atmosphere as well as a second exhaust tract with a second exhaust outlet extending into the atmosphere. The second exhaust outlet is located in front of the first exhaust outlet in the direction of travel of the vehicle.

31 Claims, 8 Drawing Sheets

(51) Int. Cl.
*F01N 13/08* (2010.01)
*B60K 1/04* (2019.01)
*F01N 13/10* (2010.01)

(52) U.S. Cl.
CPC ...... *F01N 13/10* (2013.01); *B60K 2001/0438* (2013.01); *B60Y 2200/92* (2013.01); *F01N 2230/02* (2013.01); *F01N 2230/04* (2013.01); *F01N 2240/36* (2013.01); *F01N 2260/14* (2013.01); *F01N 2260/20* (2013.01); *F01N 2340/04* (2013.01); *F01N 2410/10* (2013.01); *F01N 2590/11* (2013.01); *F01N 2900/10* (2013.01); *Y10S 903/904* (2013.01)

(56) References Cited

U.S. PATENT DOCUMENTS

| | | | |
|---|---|---|---|
| 5,622,311 A * | 4/1997 | Huston | B60H 1/00014 237/12.3 C |
| 6,334,501 B1 | 1/2002 | Kawamoto | |
| 6,662,554 B2 * | 12/2003 | Sheidler | F01N 1/166 137/487 |
| 8,181,732 B1 | 5/2012 | Butler | |
| 2003/0116378 A1 | 6/2003 | Cathcart et al. | |
| 2004/0006970 A1 | 1/2004 | Worner et al. | |
| 2007/0057564 A1 * | 3/2007 | Colling | B60P 1/286 298/1 H |
| 2008/0093151 A1 * | 4/2008 | Ogawa | B60K 13/04 180/296 |
| 2009/0152934 A1 * | 6/2009 | Devries | B60P 1/283 298/1 H |
| 2010/0170228 A1 * | 7/2010 | Dickinson | B60H 1/00014 60/287 |
| 2011/0278090 A1 | 11/2011 | Wirth et al. | |
| 2013/0146391 A1 | 6/2013 | Fritz et al. | |
| 2014/0260243 A1 | 9/2014 | Zhang | |
| 2014/0318888 A1 | 10/2014 | Kess et al. | |

FOREIGN PATENT DOCUMENTS

| | | |
|---|---|---|
| DE | 197 34 498 A1 | 2/1999 |
| DE | 100 45 499 A1 | 4/2001 |
| DE | 102 31 056 A1 | 2/2004 |
| DE | 601 08 685 T2 | 6/2005 |
| DE | 10 2010 020 033 A1 | 11/2011 |
| DE | 11 2011 101 489 T5 | 2/2013 |
| DE | 10 2011 114 772 A1 | 4/2013 |
| DE | 10 2011 088 150 A1 | 6/2013 |
| DE | 10 2014 204 217 A1 | 9/2014 |
| JP | 5-208617 A | 8/1993 |
| JP | 2003-326980 A | 11/2003 |

OTHER PUBLICATIONS

German-language Written Opinion (PCT/ISA/237) issued in PCT Application No. PCT/EP2016/079848 dated Mar. 8, 2017 (seven pages).

German-language Office Action issued in counterpart German Application No. 10 2016 200 536.7 dated Aug. 30, 2016 (four pages).

Chinese Office Action issued in Chinese application No. 201680052896.5 dated Feb. 3, 2020, with partial English translation (Sixteen (16) pages).

* cited by examiner

VEHICLE COMPRISING A DUAL-BRANCH EXHAUST SYSTEM

CROSS REFERENCE TO RELATED APPLICATIONS

This application is a continuation of PCT International Application No. PCT/EP2016/079848, filed Dec. 6, 2016, which claims priority under 35 U.S.C. § 119 from German Patent Application No. 10 2016 200 536.7, filed Jan. 18, 2016, and from German Patent Application No. 10 2015 225 367.8, filed Dec. 16, 2015, the entire disclosures of which are herein expressly incorporated by reference.

BACKGROUND AND SUMMARY OF THE INVENTION

The present invention relates to a vehicle having a dual-branch exhaust-gas system.

Classic exhaust-gas systems run in the underfloor region of a passenger motor vehicle in a rearward direction from an internal combustion engine arranged in the vehicle front-end section, and normally open out into the surroundings via a tailpipe in a rear apron region.

German patent application DE 102 31 056 A1 of J. Eberspächer GmbH & Co. KG discloses a vehicle having a V-configuration engine with left-hand and right-hand cylinder banks. The two cylinder banks are assigned in each case one exhaust-gas manifold. Exhaust-gas outlets of the two exhaust-gas manifolds open into a pre-silencer. From the pre-silencer, a left-hand and a right-hand exhaust-gas tract lead into a rear-end region of the vehicle, where the exhaust gas emerges into the surroundings. The exhaust-gas tracts are of different design with regard to their damping action or their flow resistance, that is to say one exhaust-gas tract has a greater flow resistance than the other exhaust-gas tract.

The exhaust-gas system described in DE 102 31 056 A1 furthermore has an electronically actuable flap arrangement. It is provided that, in a lower rotational speed range of the internal combustion engine, the exhaust gas is conducted exclusively or predominantly through one of the two exhaust-gas tracts. In a medium rotational speed range, the exhaust gas is conducted exclusively or predominantly through the other of the two exhaust-gas tracts. And, in an upper rotational speed range, the exhaust gas is conducted in parallel through both exhaust-gas tracts.

Exhaust-gas systems which conduct the collective exhaust-gas stream via multiple exhaust-gas tracts to the vehicle rear end take up a relatively large structural space, because the individual components of the exhaust-gas tracts (pre- and post-silencers, etc.) must, for thermal reasons, be spaced apart sufficiently far from other components of the vehicle and/or correspondingly thermally insulated.

This applies, in particular, in the case of (highly) electrified vehicles, wherein it is sought to utilize the structural space in the central tunnel region for the integration of high-voltage battery components. The introduction of heat by the exhaust-gas system into adjacently arranged high-voltage battery components is particularly undesired, and under some circumstances constitutes an exclusion criterion for the arrangement of a high-voltage battery in the region of the central tunnel.

It is an object of the present invention to provide a vehicle having a multi-branch, in particular dual-branch, exhaust-gas system, which is suitable for vehicles in which restricted structural space conditions exist in the underfloor region (for example, in electrified vehicles or hybrid vehicles), wherein the exhaust-gas system should be acoustically as inconspicuous as possible at low levels of engine power, at low speeds or in standstill situations.

This and other objects are achieved by a vehicle, comprising: an internal combustion engine; and an exhaust-gas system which has at least one first exhaust-gas tract with at least one first exhaust-gas outlet opening into surroundings and at least one second exhaust-gas tract with at least one second exhaust-gas outlet opening into the surroundings, wherein as viewed in a direction of travel of the vehicle, the at least one second exhaust-gas outlet is located in front of the at least one first exhaust-gas outlet.

The starting point of the invention is a vehicle having an internal combustion engine (e.g. an Otto-cycle engine or a diesel engine) and an exhaust-gas system which has at least one first exhaust-gas tract with at least one first exhaust-gas outlet opening into the surroundings (atmosphere) and at least one second exhaust-gas tract with at least one second exhaust-gas outlet opening into the surroundings.

A core concept of the invention consists in that, as viewed in the direction of travel of the vehicle, the at least one second exhaust-gas outlet is situated in front of the at least one first exhaust-gas outlet. By contrast to DE 102 31 056 A1 as discussed above, it is thus specifically not the case that both exhaust-gas tracts extend rearward into the rear-end region of the vehicle.

It may rather be provided that, as viewed in a side view of the vehicle, the first exhaust-gas outlet is situated in a rear vehicle half (rear-end region of the vehicle) and the second exhaust-gas outlet is situated in a front vehicle half. It may, for example, be provided that the first exhaust-gas outlet is—similarly to the situation in most conventional vehicles—situated behind a rear axle of the vehicle.

By contrast, the second exhaust-gas outlet may be arranged in front of a bulkhead of the vehicle, that is to say in front of a passenger compartment of the vehicle. The internal combustion engine may also be arranged in this region, that is to say in front of the bulkhead of the vehicle, similarly to the situation in most conventional vehicles.

The second exhaust-gas outlet may be arranged in a side region of the vehicle front-end section, and may, for example, open laterally into the surroundings in front of the left-hand or the right-hand front wheel. In principle, it would however also be possible for the second exhaust-gas outlet to open laterally into the surroundings behind one of the two front wheels.

The first exhaust-gas tract has a first exhaust-gas pipe and the second exhaust-gas tract has a second exhaust-gas pipe (and in each case possibly further components, such as for example a catalytic converter, particle filter, etc.). It may be provided that the flow cross section or the "diameter" of the first exhaust-gas pipe is smaller than the flow cross section or the "diameter" of the second exhaust-gas pipe. Accordingly, less structural space is required for the first, "rearwardly leading exhaust-gas pipe" than for the second exhaust-gas pipe, which runs in the front of the vehicle.

Such an exhaust-gas system concept is suitable in particular for vehicles in which only relatively little structural space is available in the underfloor region, in particular in the region of a central tunnel of the vehicle body.

For example, it may be provided that the ratio between the flow cross section of the first exhaust-gas pipe and the flow cross section of the second exhaust-gas pipe lies in a range between 5% and 50%, in particular in a range between 10% and 20%. The flow cross section of the first exhaust-gas pipe is thus significantly smaller than the flow cross section of the second exhaust-gas pipe, and accordingly takes up less structural space.

The internal combustion engine of the vehicle has at least one exhaust-gas manifold which combines the exhaust gas from individual cylinders of the internal combustion engine to form a collective exhaust-gas stream at an exhaust-gas manifold outlet.

An exhaust-gas system according to the present invention furthermore has an "exhaust-gas branching point device" ("exhaust-gas branching point" for short). The exhaust-gas branching point in turn has an exhaust-gas inlet for the collective exhaust-gas stream passing from the internal combustion engine or from the at least one exhaust-gas manifold of the internal combustion engine, and also a first exhaust-gas outlet, to which first exhaust-gas tract is connected, and a second exhaust-gas outlet, to which the second exhaust-gas tract is connected.

A catalytic converter and/or a particle filter (Otto-cycle engine particle filter or diesel particle filter depending on the type of internal combustion engine) may be arranged in a region between the exhaust-gas manifold outlet of the at least one exhaust-gas manifold and the exhaust-gas inlet of the exhaust-gas branching point. It may for example be provided that the particle filter is arranged downstream of the catalytic converter in the flow direction of the exhaust gas.

In a first variant of the invention, a "central pre-silencer" is provided, which may likewise be arranged in the exhaust-gas system section between the internal combustion engine and the exhaust-gas inlet of the exhaust-gas branching point. The exhaust gas passing from the internal combustion engine thus flows in an already sound-deadened manner into the exhaust-gas branching point.

It may alternatively be provided that the exhaust gas passing from the internal combustion engine flows in a substantially non-sound-deadened manner into the exhaust-gas branching point, that is to say that no central pre-silencer is arranged in the exhaust-gas system section situated between the internal combustion engine and the exhaust-gas branching point, but rather a first and second pre-silencer are arranged in the first exhaust-gas tract and in the second exhaust-gas tract.

In both variants, it is furthermore possible for, in each case, one first and second end silencer to be arranged in the first exhaust-gas tract and in the second exhaust-gas tract.

It is preferably possible for the second and/or the first exhaust-gas tract to be selectively activated or deactivated. For this purpose, a switching device may be provided which can assume three different operating states. Accordingly, in a manner dependent on the presently set operating state of the switching device, the entire exhaust-gas stream passing from the internal combustion engine (collective exhaust-gas stream) is selectively either:
(1) conducted exclusively via the first, "rear" exhaust-gas tract into the surroundings (1st operating state), or
(2) exclusively via the second, "front" exhaust-gas tract (2nd operating state), or
(3) "split", that is to say a first partial exhaust-gas stream of the collective exhaust-gas stream is conducted via the first exhaust-gas tract and the remaining (second) partial exhaust-gas stream of the collective exhaust-gas stream is conducted via the second exhaust-gas tract into the surroundings (3rd operating state).

During operation of the vehicle, it may be provided that, at low levels of power of the internal combustion engine and in the presence of the associated relatively small exhaust-gas mass streams, the exhaust gas is conducted primarily or exclusively rearward via the first exhaust-gas tract, and emerges into the surroundings in the region of the vehicle rear-end section. This has the advantage that, in the presence of low load, that is to say when at a standstill and/or at low speeds, the exhaust-gas stream is discharged rearward into the atmosphere, and it is in no way possible for said exhaust-gas stream to enter the passenger compartment via a possibly open side window of the vehicle or via the air-conditioning system intake.

At high levels of power of the internal combustion engine and in the presence of the associated relatively large exhaust-gas mass streams, the exhaust gas may be conducted into the surroundings primarily or exclusively via the second exhaust-gas tract in the region of the vehicle front-end section. It may thus be provided that, at high levels of power or at high speeds of the vehicle, the second exhaust-gas tract is "activated", or that, at high levels of power, a "switchover" to the second exhaust-gas tract is performed. Owing to the flow conditions at relatively high vehicle speeds, a situation is ruled out in which exhaust gas can pass into the passenger compartment through a possibly open side window of the vehicle or via the air-conditioning system intake.

As an alternative to the first variant mentioned above, a switching device may be provided which can assume only two different operating states, wherein, in a manner dependent on the set operating state, the collective exhaust-gas stream:
(1) is either conducted via the first exhaust-gas tract into the surroundings (1st operating state), or
(2) a first partial exhaust-gas stream is conducted via the first exhaust-gas tract into the surroundings and a second partial exhaust-gas stream is conducted via the second exhaust-gas tract into the surroundings (2nd operating state).

By contrast to the first variant, it is thus always the case in the second variant that at least a partial volume stream of the collective exhaust-gas stream is conducted via the first exhaust-gas tract into the surroundings.

The dual-branch exhaust-gas system according to the invention is used in particular for "electrified vehicles". Owing to the relatively short structural length of the second, front exhaust-gas tract, this may duly be acoustically somewhat more strongly perceptible than the first, rear exhaust-gas tract. However, through corresponding actuation of the switching device, it can be achieved that, in situations in which the noises generated by the exhaust-gas system should be as low as possible (for example in standstill situations of the vehicle or at low speeds), the exhaust gas is conducted primarily or exclusively rearward in the direction of the rear end of the vehicle, and into the surroundings, via the acoustically considerably less perceptible first exhaust-gas tract. In this way, it is possible, in particular in the case of hybrid vehicles, for the acoustic perceptibility of the exhaust-gas system to be limited to a minimum, whereby the vehicle can be experienced by the driver as an "electrified vehicle" to a particularly high degree.

For this purpose, the switching device has at least one switching element, which may be formed for example by an electrically actuable flap. The at least one switching element may be arranged for example in or at the exhaust-gas branching point and may be formed for example as a switchover flap, which is adjustable in stepped or continuously variable fashion. A "switchover flap" is to be understood to mean a switching device, by means of the actuation of which the flow cross section of one exhaust-gas tract is increased in size and at the same time the flow cross section of the other exhaust-gas tract is decreased in size.

Alternatively or additionally, the switching device may have in each case one switching element in each of the two exhaust-gas tracts, wherein the two switching elements are controllable or actuatable independently of one another. Such switching elements integrated into the partial tracts may be formed for example as sliding flaps with the capability of continuously variable adjustment.

For the control of the switching device, control electronics are provided which switch the switching device into a particular operating state:
(a) in a manner dependent on the operating state of the internal combustion engine (for example in a manner dependent on the present engine power, the engine rotational speed or the like), and/or
(b) in a manner dependent on the operating state of the vehicle (for example in a manner dependent on the speed of the vehicle and/or on the present position of the vehicle (within built-up areas/outside built-up areas, etc.) and/or in a manner dependent on a noise level measured by a noise sensor in the passenger cell of the vehicle or on the body of the vehicle).

In particular, it may be provided that the switching device is situated in an operating state in which the collective exhaust-gas stream is conducted entirely or predominantly (for example more than 50%, 60%, 70%, 80%, 90%) "rearward" via the first exhaust-gas tract into the surroundings if the power output by the internal combustion engine and/or the speed of the vehicle is in a predefined low power range or in a predefined low speed range (for example V<60 km/h).

As already mentioned, the exhaust-gas system according to the invention is suitable in particular for hybrid vehicles, in which an electric drive machine provided for generating vehicle propulsion is arranged in the region of the rear axle. In such hybrid vehicle concepts, there is generally only little structural space, in which a large-volume exhaust-gas system could be arranged, available in the underfloor region of the vehicle. The exhaust-gas system according to the invention, in which the exhaust-gas pipe leading "rearward" is of relatively small dimensions, is therefore particularly suitable for such vehicle concepts.

The invention may self-evidently also be used in other vehicle concepts. These include for example a vehicle concept in which a so-called "range extender" ("small" internal combustion engine which drives a generator provided for generating electricity) is arranged together with an electric machine in the front-end region of the vehicle, wherein a (large) electrical energy store is arranged in the underfloor region of the vehicle, that is to say below the passenger cell.

In one refinement of the invention, it is provided that the first exhaust-gas tract or at least a partial section of the first exhaust-gas tract is arranged in a central longitudinal region situated below a passenger compartment of the vehicle. In most vehicles, this central longitudinal region is formed as a so-called "central tunnel". An arrangement of the first exhaust-gas tract or of a partial section thereof in a central longitudinal region of the underfloor space of the vehicle is, however, not imperatively necessary.

The first exhaust-gas tract or a partial section of the first exhaust-gas tract may also—in relation to a central longitudinal axis of the vehicle extending in a vehicle longitudinal direction—be arranged eccentrically or in a laterally offset manner. For example, the first exhaust-gas tract or a partial section of the first exhaust-gas tract may be arranged laterally adjacent to one of the two sills (body region which extends in the vehicle longitudinal direction below the doors of the vehicle), wherein the sill conceals or covers the first exhaust-gas tract or a partial section of the first exhaust-gas tract from the outside. If the sills are formed as hollow profiles, the first exhaust-gas tract or a partial section of the first exhaust-gas tract may also be arranged within the sill profile.

If the vehicle is an electrified vehicle or a hybrid vehicle, it may be provided that electrical energy store units are arranged in a region to the left and in a region to the right of the partial section of the first exhaust-gas tract or of the central tunnel below the passenger compartment. Since the flow cross section of the first exhaust-gas tract is relatively small, the thermal loading of high-voltage components possibly arranged in said region is also correspondingly low. As an alternative to this, as already mentioned above, it is also possible, in the case of a hybrid vehicle in which an electrical energy store is arranged in the central region of the underfloor region, for the first exhaust-gas tract or a partial section of the first exhaust-gas tract to be arranged laterally adjacent to the electrical energy store, in particular in a region between the electrical energy store housing and the left-hand or right-hand sill.

With regard to the vertical alignment of the first exhaust-gas tract or of a partial section of the first exhaust-gas tract, there are likewise numerous possibilities.

The first exhaust-gas tract or a partial section of the first exhaust-gas tract may for example be arranged in the (vertical) region in which the electrical energy store is also arranged. In the case of a central arrangement of the first exhaust-gas tract or of a partial section of the first exhaust-gas tract, it may be provided that the first exhaust-gas tract or a partial section of the first exhaust-gas tract extends between two energy store parts (right-hand part and left-hand part) in the direction of the vehicle rear end.

As an alternative to this, it would also be possible for the first exhaust-gas tract or a partial section of the first exhaust-gas tract to be arranged above or below the electrical energy store, which has the advantage that the energy store can be designed without problems as a single-part, for example cuboidal housing.

In the above description, where the expression "at least" is omitted in conjunction with the first exhaust-gas tract, the first exhaust-gas outlet, the second exhaust-gas tract and/or the second exhaust-gas outlet, this is not to be understood in a restrictive sense, but is rather to be understood as meaning also that more than one first exhaust-gas tract, first exhaust-gas outlet, second exhaust-gas tract and/or second exhaust-gas outlet may be provided.

The wording "exhaust-gas system with at least one first exhaust-gas tract" or "at least one first exhaust-gas outlet that opens into the surroundings" used above is thus to be understood to mean that, in all exemplary embodiments of the invention, it is in principle also possible for exhaust gas to be conducted into the surroundings via two or via more than two "first exhaust tracts" or "first exhaust-gas outlets". Correspondingly to the abovementioned core concept of the invention, the second exhaust-gas outlet would then be situated in front of the two first exhaust-gas outlets or in front of the more than two first exhaust-gas outlets. Analogously, it is also possible for two or more than two second exhaust-gas tracts and/or two or more than two second exhaust-gas outlets to be provided. The invention is thus expressly not restricted to exactly one first exhaust-gas outlet and exactly one second exhaust-gas outlet.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
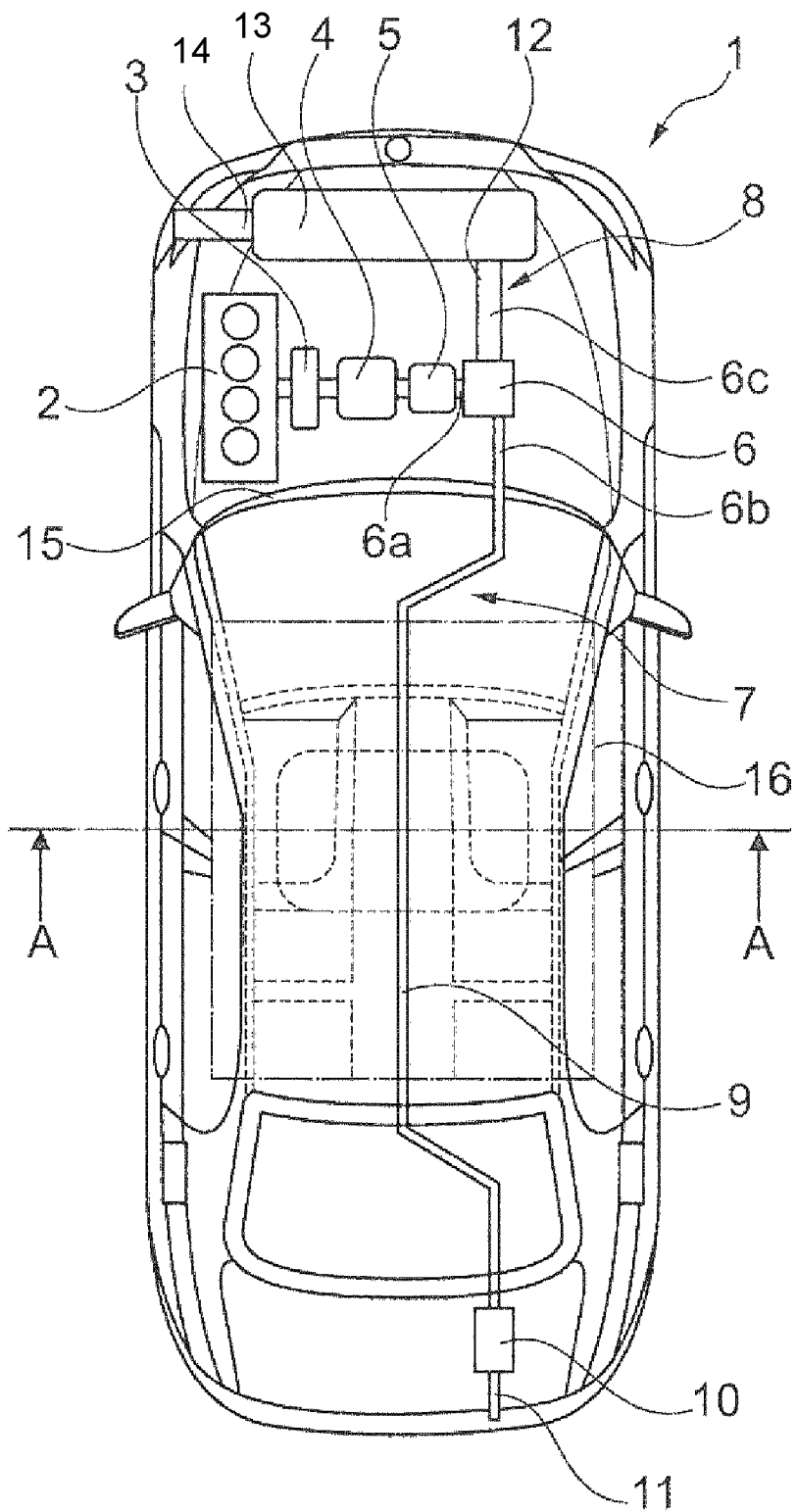
FIG. 1 shows a first exemplary embodiment according to the invention.

FIG. 1 shows a vehicle 1 which can be driven by an internal combustion engine 2. An exhaust-gas manifold (not illustrated in any more detail) merges the exhaust gases discharged from individual cylinders of the internal combustion engine 2 to form a collective exhaust-gas stream.

The collective exhaust-gas stream is then conducted firstly through a catalytic converter 3, which may be a three-way catalytic converter with closed-loop control. A particle filter 4 is arranged downstream of the catalytic converter 3 in the flow direction of the collective exhaust-gas stream. If the internal combustion engine 2 is an Otto-cycle engine, the particle filter 4 is an Otto-cycle engine particle filter. A pre-silencer 5 is arranged downstream of the particle filter 4 in the flow direction.

Downstream of the pre-silencer 5 there is arranged an "exhaust-gas branching point 6", which has an exhaust-gas inlet 6a, a first exhaust-gas outlet 6b and a second exhaust-gas outlet 6c. Via the exhaust-gas inlet 6a, the collective exhaust-gas stream passing from the pre-silencer 5 flows into the exhaust-gas branching point 6.

In the exhaust-gas branching point 6, the collective exhaust-gas stream can be distributed between a first exhaust-gas tract 7 and a second exhaust-gas tract 8. For this purpose, an electronically controllable switching device may be provided in the exhaust-gas branching point 6 or at the two exhaust-gas outlets 6b, 6c, which switching device is formed for example by one or more switchable flaps or other electronically controllable switching elements, and permits a distribution of the volume stream between the two exhaust-gas tracts 7, 8.

The first exhaust-gas tract 7 has a first exhaust-gas pipe 9 which, from the first exhaust-gas outlet 6b of the first exhaust-gas branching point 6, extends in a central longitudinal region of the underfloor region of the vehicle rearwardly in the direction of the vehicle rear end, where a first end silencer 10 is arranged. After flowing through the first end silencer 10, the exhaust gas flowing through the first exhaust-gas tract 7 is emitted into the surroundings (atmosphere) via a first exhaust-gas outlet 11 at the vehicle rear end.

From the second exhaust-gas outlet 6c of the exhaust-gas branching point 6, exhaust gas flows via a second exhaust-gas pipe 12 into a second end silencer 13, which is arranged in a front-end region of the vehicle. Exhaust gas passing from the second end silencer 13 flows laterally into the surroundings via a second exhaust-gas outlet 14 in front of a left-hand front wheel (not illustrated in any more detail here) of the vehicle.

If the vehicle is a left-hand drive vehicle, it is advantageous if the second exhaust-gas outlet 14 flows into the surroundings on the left-hand side of the vehicle, that is to say on the "oncoming-traffic side". In the case of a right-hand drive vehicle, it is advantageous if the second exhaust-gas outlet flows into the surroundings on the right-hand side of the vehicle.

As already indicated in FIG. 1, the first exhaust-gas pipe 9, that is to say that exhaust-gas pipe that leads to the vehicle rear end, has a smaller flow cross section or a smaller diameter than the second exhaust-gas pipe 12, which leads to the exhaust-gas outlet 14 arranged in the vehicle front-end region, that is to say to the exhaust-gas outlet 14 arranged in front of a bulkhead 15.

By means of the switching device already mentioned above but not illustrated in any more detail in FIG. 1, the volume stream distribution can be performed in an operating-state-dependent manner. For example, it may be provided that, at low levels of power of the internal combustion engine 2 or at low internal combustion engine rotational speeds and/or low vehicle speeds, the entire exhaust-gas volume stream output by the internal combustion engine 2, or a major part of the volume stream output by the internal combustion engine, is discharged into the surroundings via the first exhaust-gas tract 7. At relatively high levels of internal combustion engine power and/or at relatively high internal combustion engine rotational speeds and/or relatively high vehicle speeds, the second exhaust-gas tract 8 is "activated", or possibly even the entire exhaust-gas volume stream is then discharged into the surroundings via the second exhaust-gas tract 8.

The exhaust-gas system arrangement shown in FIG. 1 is advantageous in particular in the case of electrified vehicles or hybrid vehicles in which an electrical energy store (for example high-voltage battery 16) is arranged below the passenger compartment.

Figure 2:
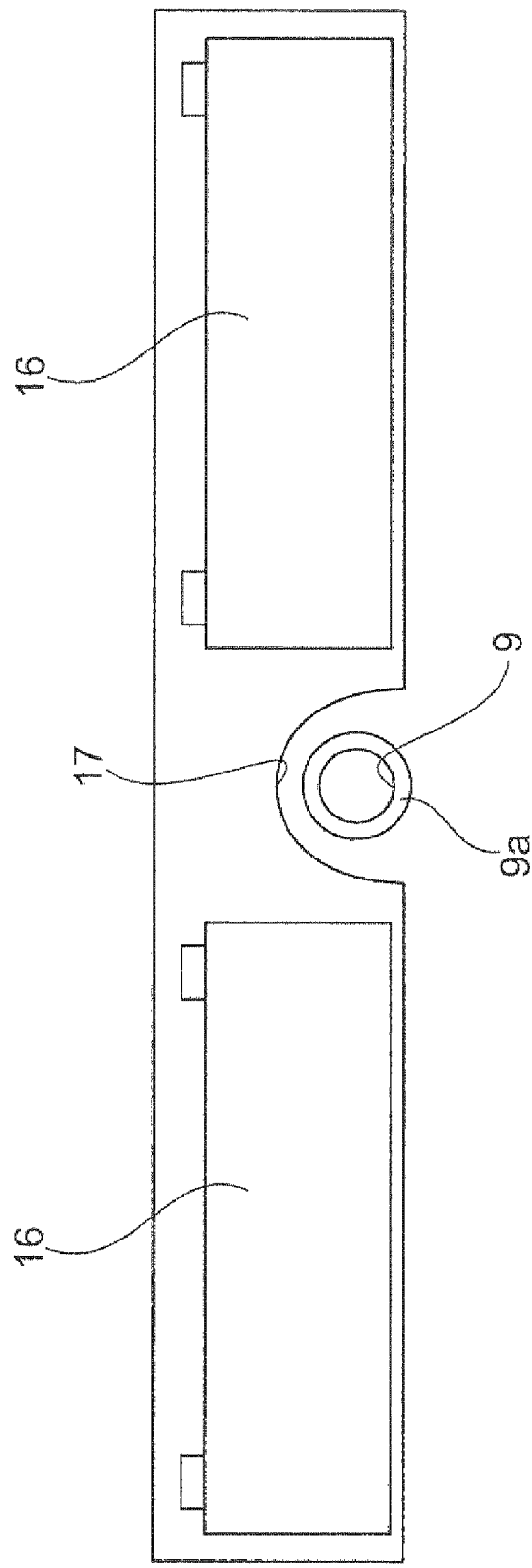
FIG. 2 shows a section through the vehicle in the underfloor region along the section line A-A.

FIG. 2 shows a section along the section line A-A shown in FIG. 1, in the underfloor region of the vehicle. As can be seen from FIG. 2, a high-voltage battery 16 is accommodated in the underfloor region of the vehicle on both sides, that is to say to the left and to the right of the first exhaust-gas pipe 9, which extends through a central tunnel 17.

For example, individual battery modules, which are in turn each made up of multiple electrically interconnected battery cells, may be arranged on both sides of the central tunnel 7.

Since the first exhaust-gas pipe 9 has a relatively small cross section or diameter in relation to the second exhaust-gas pipe 12, the space requirement is correspondingly small, which has the advantage that a correspondingly greater amount of space is available for accommodating battery cells or battery modules of the high-voltage battery 16.

As already mentioned, the collective exhaust-gas stream is conducted through the first exhaust-gas pipe 9 preferably only at low levels of internal combustion engine power or at low internal combustion engine rotational speeds or vehicle speeds. The release of heat via the first exhaust-gas pipe 9, and thus the introduction of heat into the high-voltage battery 16, is correspondingly low. It is preferable for thermal insulation to be fitted between the first exhaust-gas pipe 9 and the high-voltage battery 16, for example in the form of a heat shield plate, a thermally insulating exhaust-gas pipe casing 9a or the like.

Figure 3:
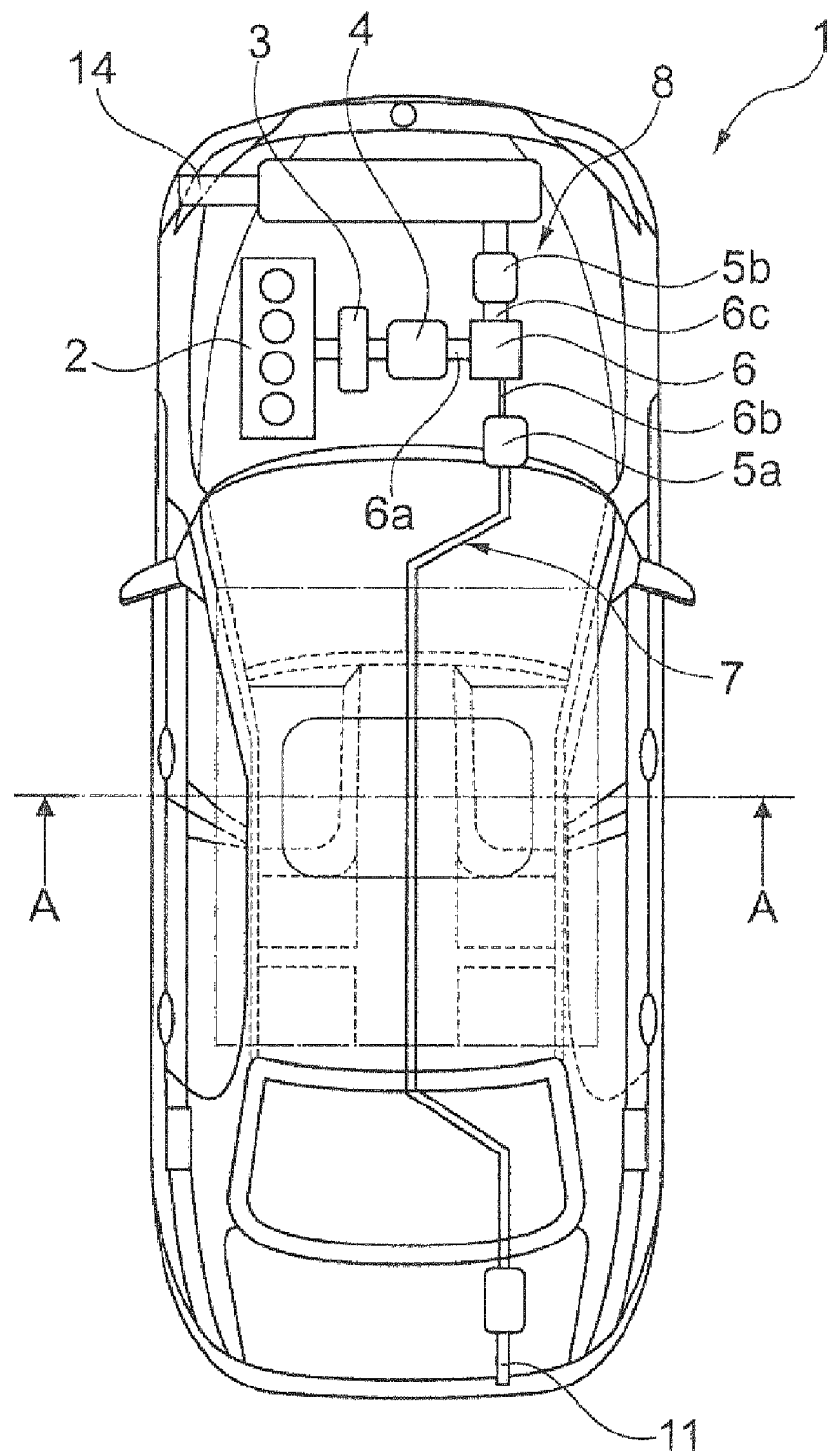
FIG. 3 shows a second exemplary embodiment according to the invention.

FIG. 3 shows a variant of the exemplary embodiment of FIG. 1. By contrast to the exemplary embodiment of FIG. 1, no "central pre-silencer" is provided. Here, only the catalytic converter 3 and the particle filter 4 are arranged between the exhaust-gas manifold (not illustrated in any more detail here) of the internal combustion engine 2 and the exhaust-gas inlet 6a of the exhaust-gas branching point 6. The collective exhaust-gas stream passing from the internal combustion engine 2 thus flows into the exhaust-gas branching point 6 in a substantially non-sound-deadened manner, and is distributed from there between the two exhaust-gas tracts 7, 8 by the first exhaust-gas outlet 6b and the second exhaust-gas outlet 6c, wherein a first and a second pre-silencer 5a, 5b respectively are arranged in the two exhaust-gas tracts 7, 8. The arrangement of FIG. 3 otherwise corresponds to that of FIG. 1.

Figure 4:
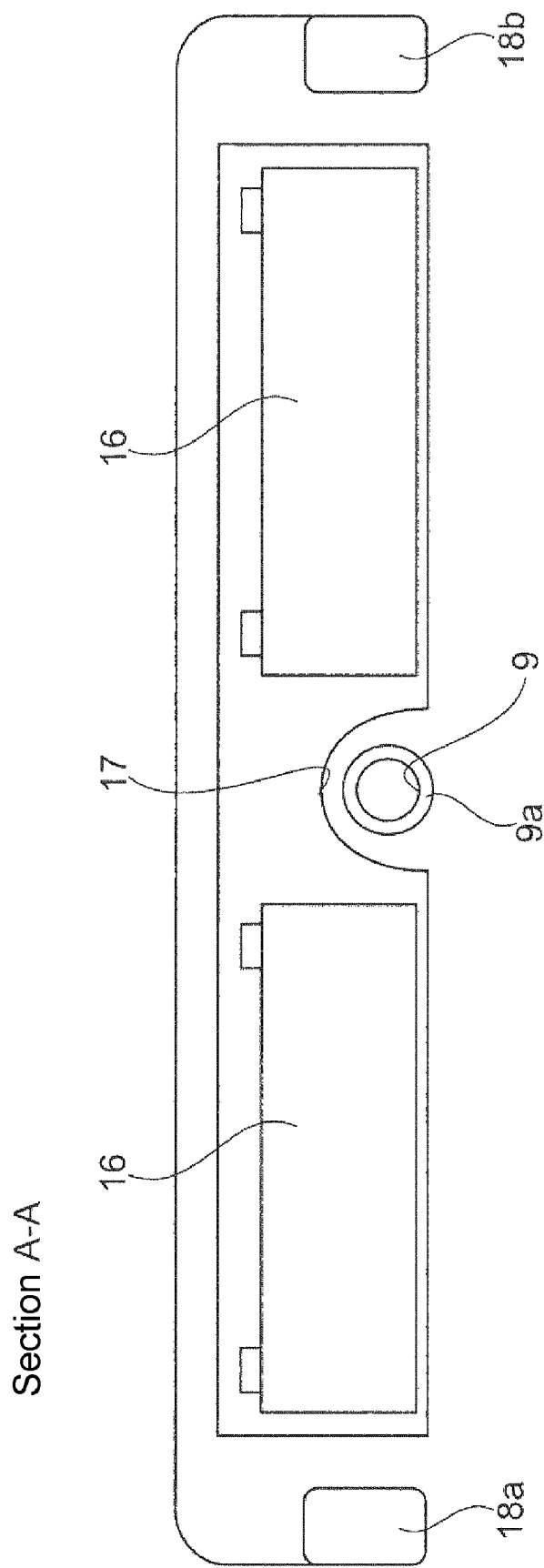
FIG. 4 shows a section through the vehicle in the underfloor region (similarly to FIG. 2), but with side sills illustrated.

FIG. 4 shows a section through the vehicle in the underfloor region (similarly to FIG. 2), but with illustrated side sills 18a, 18b, which form a part of the vehicle body. The two side sills 18a, 18b cover, from the side, at least a part of the height of the electrical energy store 16, and thus offer at least a certain degree of protection against damage in the event of a side-on crash of the vehicle.

Figure 5:
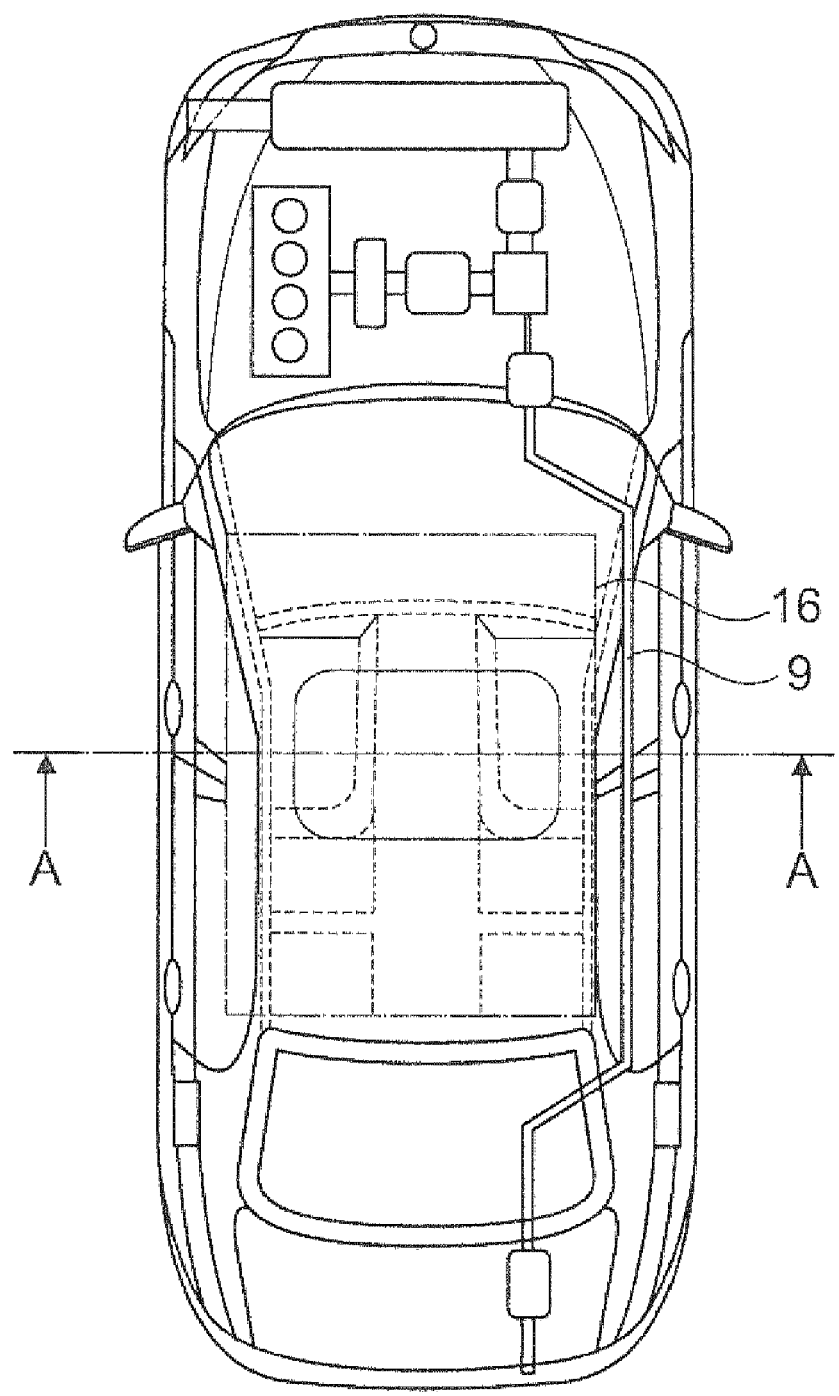
FIG. 5 shows a variant of the exemplary embodiment of FIG. 3, but with a laterally running exhaust-gas pipe.

FIG. 5 shows a variant of the exemplary embodiment of FIG. 3, but with a laterally running exhaust-gas pipe. As can be seen from FIG. 5, the exhaust-gas pipe 9 extends in this case in a region between the right-hand side of a housing of the electrical energy store 16 and the right-hand doors of the vehicle, or the sills situated below the doors. As viewed in a vertical direction (that is to say perpendicular to the plane of the drawing of FIG. 5), the exhaust-gas pipe 9 may be arranged substantially at the same "height" as the electrical energy store 16, or above or even below the electrical energy store 16.

Figure 6:
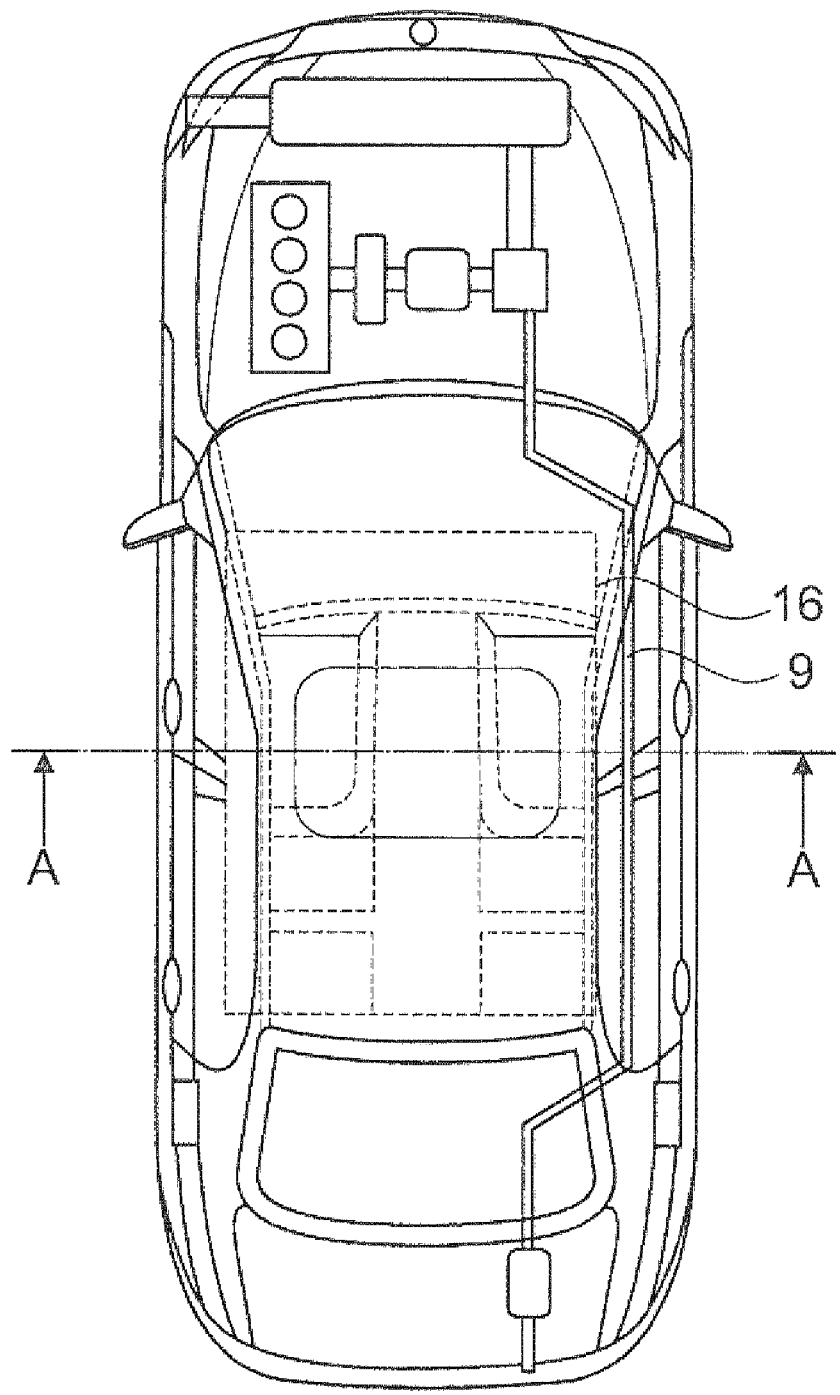
FIG. 6 shows a variant of the exemplary embodiment of FIG. 1, but with a laterally running exhaust-gas pipe.

The lateral arrangement of the exhaust-gas pipe 9 as illustrated in FIG. 5 is self-evidently also possible in the case of the exhaust-gas system illustrated in FIG. 1. For the sake of completeness, this is illustrated in FIG. 6. That which has been stated above in conjunction with FIG. 5 applies with regard to the vertical arrangement possibilities for the exhaust-gas pipe 9.

Figure 7:
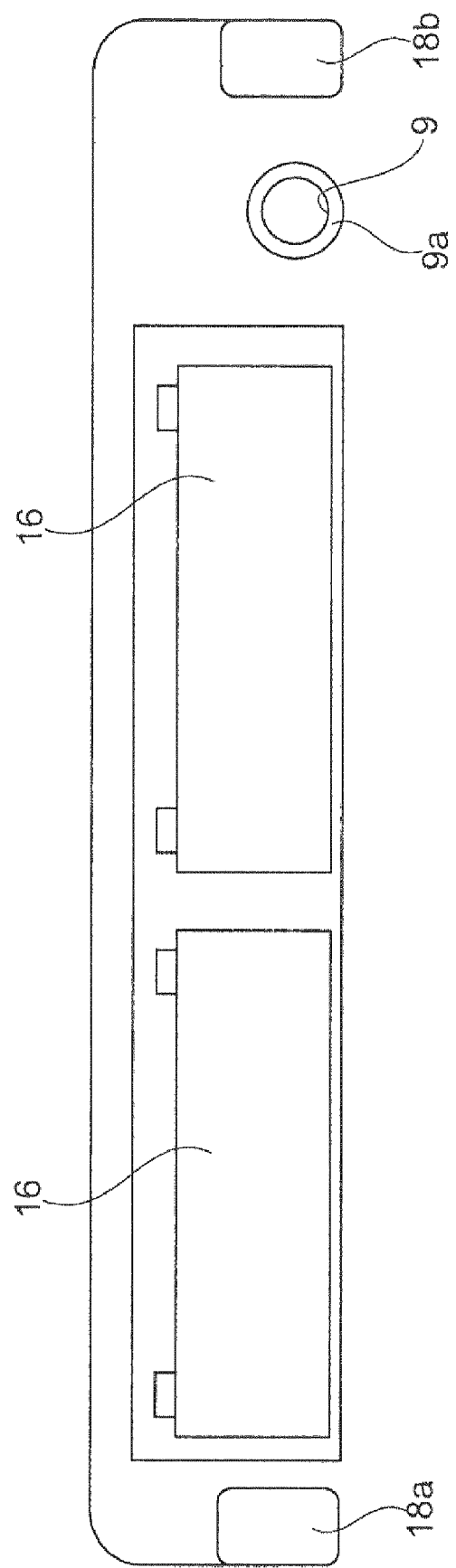
FIG. 7 shows a section through the vehicle in the underfloor region in the case of an arrangement of the exhaust-gas pipe as in FIGS. 5 and 6.

FIG. 7 shows a cross section through the underfloor region of a hybrid vehicle in the case of which the exhaust-gas pipe 9 is arranged laterally, as is the case in the variants shown in FIGS. 5 and 6. The electrical energy store 16 is arranged in the central region of the underfloor region. The exhaust-gas pipe 9, which runs in the vehicle longitudinal direction and which is encased with thermal insulation 9a, is arranged "to the right of and adjacent to" the electrical energy store 16, that is to say between a right-hand housing wall of the electrical energy store 16 and the right-hand side sill 18b.

Figure 8:
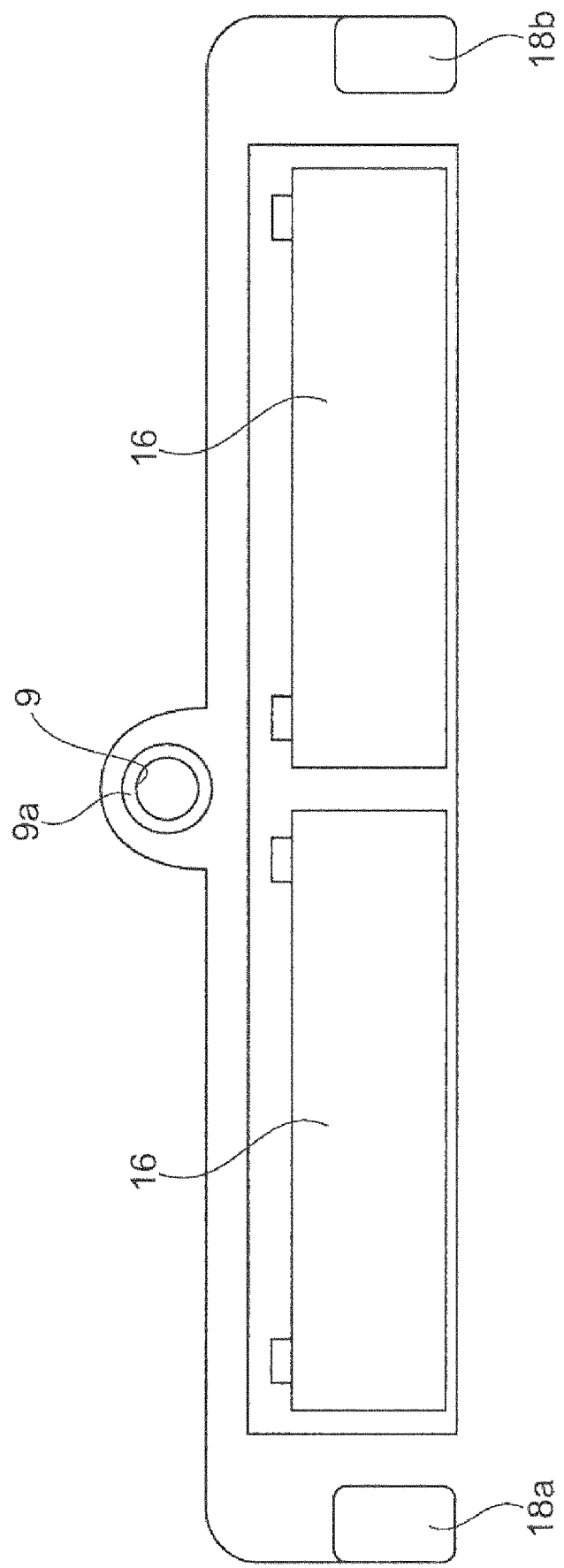
FIG. 8 shows a section through a vehicle in the underfloor region, in which the exhaust-gas pipe is arranged above the electrical energy store.

FIG. 8 shows an exemplary embodiment in which an electrical energy store 16 is arranged in the underfloor region of the vehicle. Similarly to the situation in FIG. 7, said electrical energy store is laterally partially covered by the two sills 18a, 18b. By contrast to the previous exemplary embodiments, the exhaust-gas pipe 9 in this case runs in the vehicle longitudinal direction above the electrical energy store. As an alternative to the arrangement of the exhaust-gas pipe in the vehicle center, as shown in FIG. 8, it would in principle also be possible for the exhaust-gas pipe to be arranged laterally offset in relation to the vehicle center.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   an internal combustion engine; and
   an exhaust-gas system which has at least one first exhaust-gas tract with at least one first exhaust-gas outlet opening into surroundings and at least one second exhaust-gas tract with at least one second exhaust-gas outlet opening into the surroundings, wherein
   as viewed in a direction of travel of the vehicle, the at least one second exhaust-gas outlet is located in front of the at least one first exhaust-gas outlet,
   as viewed in a side view of the vehicle, the first exhaust-gas outlet is located in a rear vehicle half and the second exhaust-gas outlet is located in a front vehicle half,
   the first exhaust-gas outlet is located behind a rear axle of the vehicle,
   the second exhaust-gas outlet is located in front of a bulkhead of the vehicle and in front of a passenger compartment of the vehicle.

2. The vehicle as claimed in claim 1, wherein
   the internal combustion engine is situated in front of the bulkhead of the vehicle.

3. The vehicle as claimed in claim 1, wherein
   the first exhaust-gas tract has a first exhaust-gas pipe and the second exhaust-gas tract has a second exhaust-gas pipe, and
   a flow cross section of the first exhaust-gas pipe is smaller than a flow cross section of the second exhaust-gas pipe.

4. The vehicle as claimed in claim 3, wherein
   a ratio between the flow cross section of the first exhaust-gas pipe and that of the second exhaust-gas pipe lies in a range between 5% and 50%.

5. The vehicle as claimed in claim 1, wherein
   the internal combustion engine has an exhaust-gas manifold which combines the exhaust gas from individual cylinders of the internal combustion engine to form a collective exhaust-gas stream at an exhaust-gas manifold outlet.

6. The vehicle as claimed in claim 5, wherein an exhaust-gas branching point is provided which has:
   (a) an exhaust-gas inlet for the collective exhaust-gas stream,
   (b) a first exhaust-gas outlet for the first exhaust-gas tract, and
   (c) a second exhaust-gas outlet for the second exhaust-gas tract.

7. The vehicle as claimed in claim 6, wherein
   a pre-silencer is arranged between the exhaust-gas manifold outlet and the exhaust-gas inlet of the exhaust-gas branching point.

8. The vehicle as claimed in claim 7, wherein
   a catalytic converter is arranged between the exhaust-gas manifold outlet and the exhaust-gas inlet of the exhaust-gas branching point.

9. The vehicle as claimed in claim 8, wherein
a particle filter is arranged between the exhaust-gas manifold outlet and the exhaust-gas inlet of the exhaust-gas branching point.

10. The vehicle as claimed in claim 9, wherein
the particle filter is arranged downstream of the catalytic converter in the flow direction of the exhaust gas.

11. The vehicle as claimed in claim 9, wherein
the pre-silencer is arranged downstream of the particle filter in the flow direction of the exhaust gas.

12. The vehicle as claimed in claim 6, wherein
the collective exhaust-gas stream passing from the exhaust-gas manifold outlet flows in a sound-deadened manner into the exhaust-gas branching point.

13. The vehicle as claimed in claim 1, wherein
the first exhaust-gas tract has a first end silencer and/or the second exhaust-gas tract has a second end silencer.

14. The vehicle as claimed in claim 13, wherein
a first pre-silencer is arranged between the first exhaust-gas outlet of the exhaust-gas branching point and the first end silencer.

15. The vehicle as claimed in claim 14, wherein
a second pre-silencer is arranged between the second exhaust-gas outlet of the exhaust-gas branching point the second end silencer.

16. The vehicle as claimed in claim 5, wherein
a switching device is provided which can assume three different operating states, wherein:
(1) in a first operating state, the collective exhaust-gas stream flows exclusively via the first exhaust-gas tract into the surroundings,
(2) in a second first operating state, the collective exhaust-gas stream flows exclusively via the second exhaust-gas tract into the surroundings, and
(3) in a third operating state, a first partial exhaust-gas stream flows via the first exhaust-gas tract into the surroundings and a second partial exhaust-gas stream flows via the second exhaust-gas tract into the surroundings.

17. The vehicle as claimed in claim 5, wherein
a switching device is provided which can assume two different operating states, wherein:
(1) in a first operating state, the collective exhaust-gas stream flows via the first exhaust-gas tract into the surroundings, and
(2) in a second operating state, a first partial exhaust-gas stream flows via the first exhaust-gas tract into the surroundings and a second partial exhaust-gas stream flows via the second exhaust-gas tract into the surroundings.

18. The vehicle as claimed in claim 16, wherein
the switching device has at least one switching element.

19. The vehicle as claimed in claim 18, wherein
the at least one switching element is arranged in or at the exhaust-gas branching point.

20. The vehicle as claimed in claim 18, wherein
the switching device has a switching element which is arranged in the first exhaust-gas tract and/or a switching element which is arranged in the second exhaust-gas tract.

21. The vehicle as claimed in claim 18, wherein
the switching element is formed by a switching flap.

22. The vehicle as claimed in claim 16, further comprising
control electronics which set an operating state of the switching device in a manner dependent on an operating state of the internal combustion engine and/or on an operating state of the vehicle.

23. The vehicle as claimed in claim 16, wherein
the switching device is situated in an operating state in which the collective exhaust-gas stream is conducted entirely or predominantly via the first exhaust-gas tract if the power output by the internal combustion engine and/or the speed of the vehicle is in a predefined low power or speed range.

24. The vehicle as claimed in claim 1, wherein
the vehicle is a hybrid vehicle.

25. The vehicle as claimed in claim 1, wherein
an electric drive machine provided for generating vehicle propulsion is arranged in the region of the rear axle of the vehicle.

26. The vehicle as claimed in claim 1, wherein
at least a partial section of the first exhaust-gas tract extends in a central longitudinal region situated below the passenger compartment of the vehicle, or in a central tunnel region of the vehicle situated below the passenger compartment of the vehicle.

27. The vehicle as claimed in claim 26, wherein
electrical energy store units are arranged in a region to the left and in a region to the right of the partial section of the first exhaust-gas tract below the passenger compartment.

28. The vehicle as claimed in claim 1, wherein
at least a partial section of the first exhaust-gas tract is arranged in a region of the vehicle situated below the passenger compartment of the vehicle, which region is laterally offset in relation to a central longitudinal axis of the vehicle extending in a vehicle longitudinal direction.

29. The vehicle as claimed in claim 28, wherein
the partial section of the first exhaust-gas tract extends in the vehicle longitudinal direction between a housing of an electrical energy store and a side sill of the vehicle body.

30. The vehicle as claimed in claim 1, wherein
as viewed in a vertical direction of the vehicle, at least one partial section of the first exhaust-gas tract is arranged:
(a) in a region in which an electrical energy store is arranged,
(b) above an electrical energy store, or
(c) below an electrical energy store.

31. A method for open-loop or closed-loop control of a distribution of a collective exhaust-gas stream between a first and a second exhaust-gas tract of a vehicle having an internal combustion engine and an exhaust-gas system which has at least one first exhaust-gas tract with at least one first exhaust-gas outlet opening into surroundings and at least one second exhaust-gas tract with at least one second exhaust-gas outlet opening into the surroundings, wherein as viewed in a direction of travel of the vehicle, the at least one second exhaust-gas outlet is located in front of the at least one first exhaust-gas outlet, as viewed in a side view of the vehicle, the first exhaust-gas outlet is located in a rear vehicle half and the second exhaust-gas outlet is located in a front vehicle half, the first exhaust-gas outlet is located behind a rear axle of the vehicle, and the second exhaust-gas outlet is located in front of a bulkhead of the vehicle and in front of a passenger compartment of the vehicle, the method comprising the acts of: distributing the collective exhaust-gas stream dependent on at least one of:
(a) a present drive power of the internal combustion engine,
(b) a speed of the vehicle,
(c) a spatial position of the vehicle, or (d) an acoustic signal which is measured in the passenger compartment or outside the passenger compartment or on the passenger compartment of the body of the vehicle.

* * * * *